US009541910B2

(12) United States Patent
Madonna et al.

(10) Patent No.: US 9,541,910 B2
(45) Date of Patent: *Jan. 10, 2017

(54) REMOTE CONTROL UNIT FOR A PROGRAMMABLE MULTIMEDIA CONTROLLER

(71) Applicant: Savant Systems, LLC, Hyannis, MA (US)

(72) Inventors: Robert P. Madonna, Osterville, MA (US); Michael E. Noonan, Sandwich, MA (US); Michael C. Silva, Hyannis, MA (US); Peter H. Corsini, East Sandwich, MA (US); Arthur A. Jacobson, Centerville, MA (US)

(73) Assignee: Savant Systems, LLC, Hyannis, MA (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/166,287

(22) Filed: Jan. 28, 2014

(65) Prior Publication Data
US 2014/0143810 A1    May 22, 2014

Related U.S. Application Data

(63) Continuation of application No. 13/789,166, filed on Mar. 7, 2013, now Pat. No. 8,766,782, which is a (Continued)

(51) Int. Cl.
*G05B 11/01* (2006.01)
*G05B 15/02* (2006.01)
(Continued)

(52) U.S. Cl.
CPC .............. *G05B 15/02* (2013.01); *G01S 5/02* (2013.01); *G01S 19/14* (2013.01); *G06F 3/0488* (2013.01);
(Continued)

(58) Field of Classification Search
CPC ......... G08C 19/28; G06F 3/0481; H04L 51/20
(Continued)

(56) References Cited

U.S. PATENT DOCUMENTS 5,734,589 A   3/1998  Kostreski et al.
5,801,881 A   9/1998  Lanni et al.
(Continued)

FOREIGN PATENT DOCUMENTS

EP     0767418 B1    1/2003
JP     2000-283782 A  10/2000
(Continued)

OTHER PUBLICATIONS

"Notification of Transmittal of the International Search Report and the Written Opinion of the International Searching Authority, or the Declaration," International Filing Date: Sep. 13, 2007, International Application No. PCT/US2007/019842, Applicant: Savant Systems LLC, Date of Mailing: May 8, 2008, pp. 1-19.

(Continued)

*Primary Examiner* — Vernal Brown
(74) *Attorney, Agent, or Firm* — Cesari and McKenna, LLP; James A. Blanchette

(57) ABSTRACT

In one embodiment, a menu is semi-transparently overlaid upon a portion of a video being shown on a television coupled to a programmable multimedia controller. The menu has a plurality of selectable options and a selection cursor disposed on one of the plurality of selectable options. Input is received from a user on the remote control unit indicating a direction. In response to the input indicating the direction, the selection cursor is moved in a corresponding direction within the semi-transparently overlaid menu to bring the selection cursor to be disposed on a designated selectable option to permit selection of the designated selectable option. In response to selection of the designated (Continued)

selectable option, the programmable multimedia controller issues one or more control commands to a lighting system, a heating ventilation and air/conditioning (HVAC) system, and/or to an automatic shade system, to control operation of lighting, HVAC or window shades.

14 Claims, 8 Drawing Sheets

Related U.S. Application Data continuation of application No. 11/520,328, filed on Sep. 13, 2006, now Pat. No. 8,421,602.

(51) Int. Cl.

| | |
|---|---|
| *G01S 5/02* | (2010.01) |
| *G01S 19/14* | (2010.01) |
| *G08C 17/02* | (2006.01) |
| *H04N 5/44* | (2011.01) |
| *G06F 3/0488* | (2013.01) |
| *H04N 21/422* | (2011.01) |
| *H04N 21/431* | (2011.01) |
| *H04N 21/47* | (2011.01) |
| *H04W 4/00* | (2009.01) |
| *H04W 4/02* | (2009.01) |

(52) U.S. Cl.
CPC .......... *G08C 17/02* (2013.01); *H04N 5/4403* (2013.01); *H04N 21/42222* (2013.01); *H04N 21/42225* (2013.01); *H04N 21/4312* (2013.01); *H04N 21/47* (2013.01); *H04W 4/008* (2013.01); *H04W 4/02* (2013.01); *G08C 2201/30* (2013.01); *G08C 2201/91* (2013.01); *G08C 2201/92* (2013.01); *H04N 2005/4416* (2013.01); *H04N 2005/4428* (2013.01); *H04N 2005/4444* (2013.01)

(58) Field of Classification Search
USPC ...................................................... 340/12.22
See application file for complete search history.

(56) References Cited

U.S. PATENT DOCUMENTS

| | | | |
|---|---|---|---|
| 5,877,821 A * | 3/1999 | Newlin ............... | H04N 7/17309 |
| | | | 348/14.08 |
| 6,215,417 B1 | 4/2001 | Krass et al. | |
| 6,266,098 B1 | 7/2001 | Cove et al. | |
| 6,396,523 B1 | 5/2002 | Segal et al. | |
| 6,538,643 B2 | 3/2003 | Mori et al. | |
| 6,563,430 B1 | 5/2003 | Kemink et al. | |
| 6,765,557 B1 | 7/2004 | Segal et al. | |
| 6,946,949 B2 | 9/2005 | Heide et al. | |
| 7,064,675 B2 | 6/2006 | Zigmond et al. | |
| 7,363,028 B2 | 4/2008 | de Clerq et al. | |
| 7,495,659 B2 | 2/2009 | Marriott et al. | |
| 7,503,014 B2 | 3/2009 | Tojo et al. | |
| 7,768,420 B2 * | 8/2010 | Neogi ................... | G08C 23/04 |
| | | | 340/10.2 |
| 2002/0190956 A1 * | 12/2002 | Klein .................... | G06F 1/1626 |
| | | | 345/169 |
| 2003/0095156 A1 | 5/2003 | Klein et al. | |
| 2003/0095456 A1 | 5/2003 | Rickes et al. | |
| 2003/0164818 A1 | 9/2003 | Miller-Smith | |
| 2004/0163073 A1 | 8/2004 | Krzyzanowski et al. | |
| 2004/0215816 A1 | 10/2004 | Hayes et al. | |
| 2005/0078676 A1 | 4/2005 | Bae et al. | |
| 2005/0086611 A1 | 4/2005 | Takabe et al. | |
| 2005/0094610 A1 | 5/2005 | de Clerq et al. | |
| 2005/0110768 A1 | 5/2005 | Marriott et al. | |
| 2005/0259069 A1 | 11/2005 | Baker et al. | |
| 2005/0259085 A1 | 11/2005 | Baker et al. | |
| 2006/0028431 A1 | 2/2006 | Leong | |
| 2006/0028454 A1 | 2/2006 | Branton et al. | |
| 2006/0070531 A1 | 4/2006 | Kiplinger et al. | |
| 2006/0082556 A1 | 4/2006 | Baker et al. | |
| 2006/0092037 A1 | 5/2006 | Neogi et al. | |
| 2006/0150120 A1 | 7/2006 | Dresti et al. | |
| 2007/0089143 A1 * | 4/2007 | LeFevre ............... | H04N 5/4401 |
| | | | 725/81 |
| 2009/0125842 A1 | 5/2009 | Nakayama | |

FOREIGN PATENT DOCUMENTS

| | | |
|---|---|---|
| JP | 2004-015831 A | 1/2004 |
| JP | 2004-514203 A | 5/2004 |
| JP | 2004-326189 A | 11/2004 |
| JP | 2005-092667 A | 4/2005 |
| JP | 2005-322427 A1 | 11/2005 |
| JP | 2005-348036 A | 12/2005 |
| JP | 2006-217292 | 8/2006 |
| KR | 10-2005-0013259 A | 2/2005 |
| WO | WO-95/16975 A1 | 6/1995 |
| WO | WO-99/09068 A1 | 2/1999 |
| WO | WO-00/17737 A1 | 3/2000 |
| WO | WO-01/78054 A1 | 10/2001 |
| WO | WO-02/39712 A2 | 5/2002 |
| WO | WO-03/044625 A2 | 5/2003 |
| WO | WO-2004/004338 A1 | 1/2004 |
| WO | WO-2005/019987 A2 | 3/2005 |
| WO | WO-2005/078676 A2 | 8/2005 |
| WO | WO-2006/070531 A1 | 7/2006 |

OTHER PUBLICATIONS

"Notification of Transmittal of the International Search Report and the Written Opinion of the International Searching Authority, or the Declaration," International Filing Date: Sep. 13, 2007, International Application No. PCT/US2007/019842, Applicant: Savant Systems LLC, Date of Mailing: Feb. 26, 2008, pp. 1-8.
Product Data Sheet for Crestron Isys® TPS-17, 17" Wide screen Tilt Touchpanel, Apr. 2006, pp. 1-4, Crestron Electronics, Inc., Rockleigh, New Jersey.
Product Data Sheet for Crestron Isys i/UM WiFi, TPMC-10 WiFi Touchpanel, Jan. 2005, pp. 1-2, Crestron Electronics, Inc., Rockleigh, New Jersey.
Supplementary European Search Report, European Application No. 12170838.2-1246, PCT/US2005041796, Applicant: Savant Systems, LLC., Date of Mailing: Jul. 4, 2012, pp. 1-7.
U.S. Appl. No. 13/789,166, filed Mar. 7, 2013 by Robert P. Madonna et al. for a Remote Control Unit for a Programmable Multimedia Controller, pp. 1-39.

* cited by examiner

REMOTE CONTROL UNIT FOR A PROGRAMMABLE MULTIMEDIA CONTROLLER

RELATED CASES

This application is a continuation of U.S. patent application Ser. No. 13/789,166 entitled REMOTE CONTROL UNIT FOR A PROGRAMMABLE MULTIMEDIA CONTROLLER, file Mar. 7, 2013 by Robert P. Madonna, et al., which is itself a continuation of U.S. patent application Ser. No. 11/520,328 entitled REMOTE CONTROL UNIT FOR A PROGRAMMABLE MULTIMEDIA CONTROLLER, filed Sep. 13, 2006 by Robert P. Madonna, et al., the contents of both of which are expressly incorporated by reference.

This application is related to the following U.S. Patent Application:

Ser. No. 11/314,112 entitled MULTIMEDIA CONTROLLER WITH PROGRAMMABLE SERVICES, by Robert P. Madonna, et al., and Ser. No. 11/314,664 entitled SYSTEM AND METHOD FOR A PROGRAMMABLE MULTIMEDIA CONTROLLER, by Robert P. Madonna, et al, the contents of both of which are expressly incorporated by reference.

BACKGROUND OF THE DISCLOSURE

Field of the Disclosure

The present disclosure relates generally to device control, and more particularly to a remote control unit for a programmable multimedia controller that controls a variety of electronic devices, such as audio devices, video devices, telephony devices, data devices, security devices, motor-operated devices, relay-operated devices, Internet access/browser devices, general-purpose computers, handicap assistance devices, and/or other types of devices.

Background Information

With the ever increasing complexity of electronic devices, simple yet effective device control is becoming increasingly important. While once electronic devices could adequately be controlled with only a handful of analog knobs and switches, modern electronic devices often present users with a vast array of configurable options and parameters, which require complex controls to manipulate and select. In response to users' demands for "convenience," these controls are often implemented on handheld remote control units, which use Infrared (IR), radio-frequency (RF), or other types of signals to interface with the electronic devices being controlled. Yet actual convenience is seldom achieved with conventional remote control units.

Users are typically burdened with having to manipulate a number of separate, device-specific remote control units, each of which typically implements a different control scheme. Thus, to perform even basic functions, a user must have all the required remote control units on hand, and be familiar with how to manipulate each one. Further, the user must understand how their devices are interconnected, so that they may select appropriate inputs for passing signals between the devices. For example, if a user desires to watch a DVD movie with the lights dimmed and a telephone ringer suppressed, he may have to operate three Audio/Video (A/V) remote control units, one for a DVD player, one for a television, and one for an Audio/Video (A/V) receiver, as well as a remote control unit for a device controller, such as an X10™ lighting controller, in addition to manipulating a handset of a cordless telephone (in a sense, yet another remote control unit). Each of these remote control units generally operates differently, and the user must transition between several control schemes to perform the desired functions. Further, the user must select the proper inputs for each device, for example so that the video signals from the DVD player will make their way through the A/V receiver for display on the television.

Many of the control schemes commonly employed with remote control units are non-intuitive and difficult to use. Most remote control units are designed with a button-centric paradigm, such that numerous function-specific buttons are crowded into a relatively small space on the face of the remote control unit. The crowded button layout of button-centric remote control units often makes it difficult to select a desired button from the many buttons available, especially in low-light conditions. If a user inadvertently presses the "wrong" button, a device may perform an unwanted action or enter an undesired mode or state. This may confuse or aggravate the user. Further, sometimes a user may be uncertain which button to press in order to activate a desired function. In such a situation, the user may have to decipher abbreviated (often cryptic) legends printed on, or about, the buttons of the remote control unit. As these legends are often only a few characters long, a user may have to refer to a manual to determine what the legends mean, and what functions are associated with each button. In short, many button-centric remote control units are far from intuitive and easy-to-use.

Furthermore, while a variety of so-called "universal" remote control units exist that claim to improve upon the shortcomings of device-specific remote control units, conventional "universal" remote controls generally fall far short of their claims. Typical "universal" remote control units simply map the functionality of the buttons of device-specific remote control units to buttons of the "universal" remote control. The underlying control schemes are generally not altered. So, while the control schemes of the device specific remote control units are all implemented on a single remote control unit, they are not unified or simplified in any way. Further, since conventional "universal" remote control units attempt to control a range of devices, they typically have even more buttons with cryptic legends than device-specific remote controls. Thus, the problems of a button-centric paradigm are aggravated. Also, most "universal" remote control units tend to be far from universal, as they typically do not operate with devices other than audio and video devices. For example, conventional "universal" remote controls do not generally include functionality for controlling telephony devices, data devices, security devices, motor-operated devices, relay-operated devices, Internet access/browser devices, general-purpose computers, handicap assistance devices, and/or other types of devices.

In addition, a variety of high-end touch-panel controllers exist that purport to improve upon device-specific remote control units. For example, Crestron Electronics, Inc. of Rockleigh, N.J. offers a line of high-end touch-panel controllers that are widely available. These touch-panel controllers incorporate central processor units, graphics controllers, I/O interfaces and other complex components similar to those found in portable computers, rendering them complicated and costly to manufacture. Further, such touchscreen controllers generally require extensive custom programming to adapt to particular installations. Thus, their complexity and cost renders them unsuitable for many applications.

Furthermore, high-end touch-panel controllers, conventional "universal" remote control units, and device specific remote control units typically lack any type of location-awareness, i.e. the ability to incorporate knowledge of the remote control unit's current location into the control scheme, or user-awareness, i.e. the ability to incorporate knowledge of the remote control unit's current user into the control scheme. This burdens the user, requiring the user to make making all location dependent decisions themselves and forgo the convenience of user-dependent control.

For example, considering the lack of location dependent control in conventional systems, suppose a user has several televisions in his or her home, and wishes to turn on a television located in the room in which he or she is sitting. With a conventional remote control unit capable of controlling all the televisions, the user generally must select the particular television with a first button of the remote control. The user must remember which button this is, or the remote control unit must be labeled in some way. Only after the correct television is selected, may the user select a second button to actually turn it on. A guest or other person unfamiliar with the remote control unit, and its control scheme, may not know which television corresponds with which button. Thus, a simple action may become quite daunting, and require trial and error to execute.

As the number of devices controlled by a remote control unit grows, the difficulties caused by a lack of location-awareness become even more apparent. For example, suppose a user has configured lighting fixtures throughout a home to be operable remotely using a device controller, such as an X10™ lighting controller. In such a configuration the lighting fixtures may readily be turned on and off with a remote control unit. Yet using a conventional control scheme on the remote control unit, a user would be required to select from a long list of available lighting fixtures, often mapped to dozens of different buttons, to simply turn on the fixture in the room he or she is entering. As is apparent, this would be quite burdensome to do each time one desires to turn on a light, and much of the convenience of remotely controlled lighting is lost.

Similarly, turning to the lack of user-dependent control in conventional systems, suppose several users each have their own individual preferences relating to control schemes, for example, individual preferences for certain options to be displayed, certain colors to be used, and/or other aesthetic or functional preferences. With a conventional system, even if a mechanism is provided to adjust these parameters, the same adjustment will be shown to all users. A user who desires to have his or her own personal control scheme is not accommodated.

What is needed is an improved remote control unit that addresses the above described shortcomings. Such a remote control unit should operate with a programmable multimedia control for controlling and interconnecting a variety of electronic devices, such as audio devices, video devices, telephony devices, data devices, security devices, motor-operated devices, relay-operated devices, Internet access/browser devices, general-purpose computers, handicap assistance devices, and/or other types of devices.

SUMMARY OF THE DISCLOSURE

A remote control unit is provided for operating a programmable multimedia controller, the remote control unit including an annular touch sensor for manipulating an annular menuing system displayed on a display device. In one embodiment, the annular menuing system includes a number of selectable options displayed as text or graphic icons. In response to a user gesturing by scrolling clockwise or counter-clockwise about the annular touch sensor, pressing firmly on the annular touch sensor, or tapping at a particular location on the annular touch sensor, the selectable options rotate in the annular menuing system. A user may fully direct their visual attention to the annular menuing system, as the remote control unit may be manipulated from tactile sensation. When an option is brought to a designated position in the menuing system, it is selected by a further action of the user. In a second embodiment, the annular menuing system includes a number of regions displayed in an annular manner, and a selection cursor is disposed upon the menuing system. In response to a user gesturing on the annular touch sensor by scrolling clockwise or counter-clockwise, the selection cursor is moved in that direction on the annular menuing system. Alternately, by pressing firmly or tapping at a particular location on the annular touch sensor, a region located at a corresponding location of the annular menuing system is selected. By selection of selectable options or regions, corresponding numerals, characters, text, devices, commands, Internet web pages, menus, or other options may be chosen. In this manner, the combination of the annular menuing system and the remote control unit with the annual sensor may replicate many of the functions provided by a mouse and keyboard, facilitating detailed control absent bulky input devices.

The remote control unit is further configured to implement location-awareness features. In one embodiment, a number of transmitter/receiver units are dispersed throughout a structure where the programmable multimedia controller is located, for example the user's home. Depending on the location of the remote control unit, a signal transmitted therefrom is received by one or more of the transmitter/receiver units. Using the signal strength received at the transmitter/receiver units, or alternately triangulation techniques or global positioning techniques, the location of the remote control unit is determined. Thereafter, control is adapted to this location, and to the devices located nearby to this location. For example, the menuing system described above may be displayed on the display most proximate to the location, as opposed to more distantly located displays. Similarly, when a user attempts to control a device, of which several are available at different locations, the nearest device is automatically selected and controlled, absent explicit specification by the user. For example, if several televisions are located in the structure, and the user selects to turn on a television, the television most proximate to the remote control unit will be activated, i.e. the television in the room in which the user is located. In such manner, the user is freed from explicitly specifying the device to be controlled where a particular device is determined (or assumed) to be the subject of the user's intentions.

Further, the remote control unit is configured to implement user-awareness features. In one embodiment, a remote control unit is associated with a particular user. When the user manipulates his or her remote control unit, a user profile is accessed and user-specific options applied to the control scheme. For example, a user may have selected certain menu arrangements, colors, or styles that suit personal preferences, and these will be displayed. Similarly, one user may have access to certain devices or services controlled or offered by the programmable multimedia controller, while another user may not have such access. In this manner, control options and access privileges may be unique to a particular remote control unit and thus to the user that operates that unit.

BRIEF DESCRIPTION OF THE DRAWINGS

This disclosure may be better understood by referring to the following description in conjunction with the accompanying drawings in which like reference numerals indicate identical or functionally similar elements.

DETAILED DESCRIPTION OF ILLUSTRATIVE EMBODIMENTS

Figure 1:
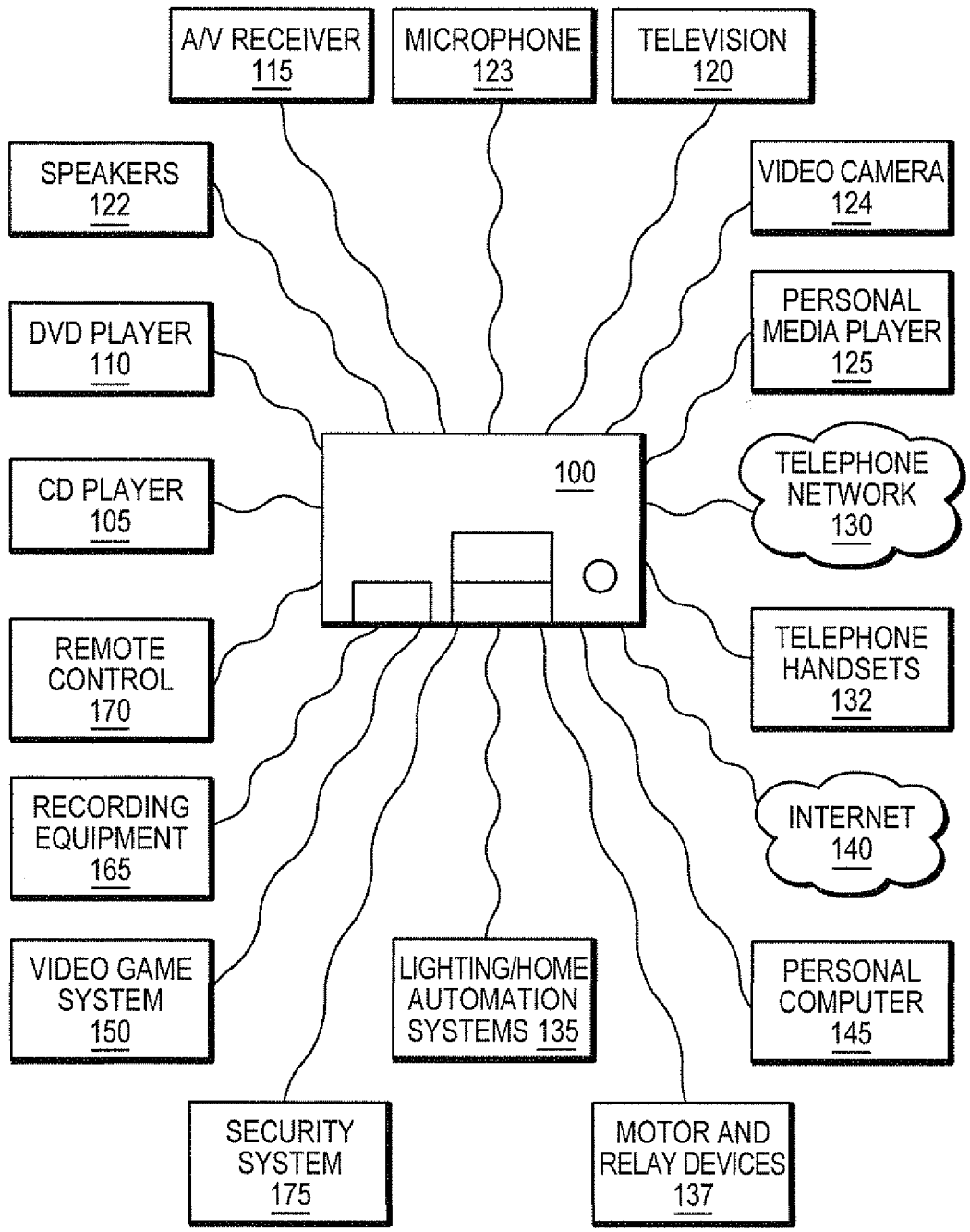
FIG. 1 is a block diagram of an illustrative programmable multimedia controller, interconnected to a number of devices, which may be used in conjunction with the remote control unit disclosed herein.

FIG. 1 is a block diagram of an illustrative programmable multimedia controller 100, interconnected to a number of devices, which may be used in conjunction with the remote control unit disclosed herein. The term "programmable multimedia controller" should be interpreted broadly as a device capable of controlling, switching data between, and/or otherwise interoperating with, a variety of electronic devices, such as audio devices, video devices, telephony devices, data devices, security devices, motor-operated devices, relay-operated devices, Internet access/browser devices, general-purpose computers, handicap assistance devices, and/or other types of devices. A programmable multimedia controller may be configured to perform all these functions and work with all these devices, or to perform a selected subset of functions and operate with a selected subset of devices.

In the example of FIG. 1, the programmable multimedia controller 100 is connected to a wide range of audio/video components, for example, a compact disk (CD) player 105, a digital video disc (DVD) player 110, an audio/video receiver 115, a television 120, a personal media player 125, speakers 122, a microphone 123, and/or a video camera 124. The programmable multimedia controller is also connected to telephony devices such as a telephone network 130 and telephone handsets 132. The telephone network 130 may be a publicly switched telephone network (PSTN), an Integrated Services Digital Network (ISDN) or other communication network.

In addition, the programmable multimedia controller intercommunicates with variety of lighting and/or home automation systems 135. These devices may operate via the X10 protocol developed by Pico Electronics, the INSTEON™ protocol developed by SmartHome, Inc, the CEBus standard managed by the CEBus Industry Council, RS232, or another well known automation or control protocol. Similarly the controller is connected to motor and/or relay operated devices 137 that may include, for example, a heating, ventilation and air conditioning (HVAC) system, an irrigation system, an automatic shade or blind system, an electronic door lock, or other types of devices.

A computer network, such as the Internet 140, is connected to the programmable multimedia controller. In addition, a personal computer (PC) 145, video game systems 150, home or studio recording equipment 165 or other devices may also be connected. Further, one or more remote control units 400 are provided to manage the controller's functionality, and/or to control devices connected to the controller. Details of the configuration of such remote control units may be found below, especially in relation to FIGS. 4-6. Each remote control unit may be interconnected to the controller via a wired network connection or a wireless connection such as an infra-red link, a radio-frequency link, a Bluetooth™ link, a ZigBee™ link, WirelessUSB™, Certified Wireless USB, WI-FI, or another appropriate data connection. Further, each remote control unit may be interconnect directly to the programmable multimedia controller 100, or interconnected through one or more separate transmitter/receiver units (not shown) that relay commands back to the programmable multimedia controller, and/or provide other functions. Further detail relating to such transmitter/receiver units is found below in reference to FIG. 7.

In addition to providing interconnection to a wide variety of devices, the programmable multimedia controller is able to combine, synthesize, and otherwise processes various data types to implement an integrated multimedia solution for a user. A detailed description of the various novel services and capabilities that may be provided is available in MULTIMEDIA CONTROLLER WITH PROGRAMMABLE SERVICES, by Robert P. Madonna, et al.

To facilitate the above described interconnections and processing, the programmable multimedia controller 100 may be arranged in a modular manner. For example, in one embodiment, the programmable multimedia controller 100 is arranged to have twelve separate input and output modules, each having a number of connection ports. The input and output modules are inserted into slots or module bays of the programmable multimedia controller 100. The modules interface with a mid-plane that provides connection to the rest of the system. By embracing a modular approach, a user is allowed to select the specific modules desired, and the system may be customized to fit a particular application. In addition, entry level pricing may be reduced by allowing a user to purchase a base configuration, with limited capabilities, and then add to the system by purchasing addition modules. Several examples of modules are discussed in SYSTEM AND METHOD FOR A PROGRAMMABLE MULTIMEDIA CONTROLLER, by Robert P. Madonna, et al. It is expressly contemplated that a wide variety of additional modules may be provided. It is also contemplated that several programmable multimedia controllers may be interconnected to create a larger system, in effect implementing a modular-type solution at the controller level. Further details regarding such interconnection and expansion may also be found in SYSTEM AND METHOD FOR A PROGRAMMABLE MULTIMEDIA CONTROLLER, by Robert P. Madonna, et al.

Figure 2:
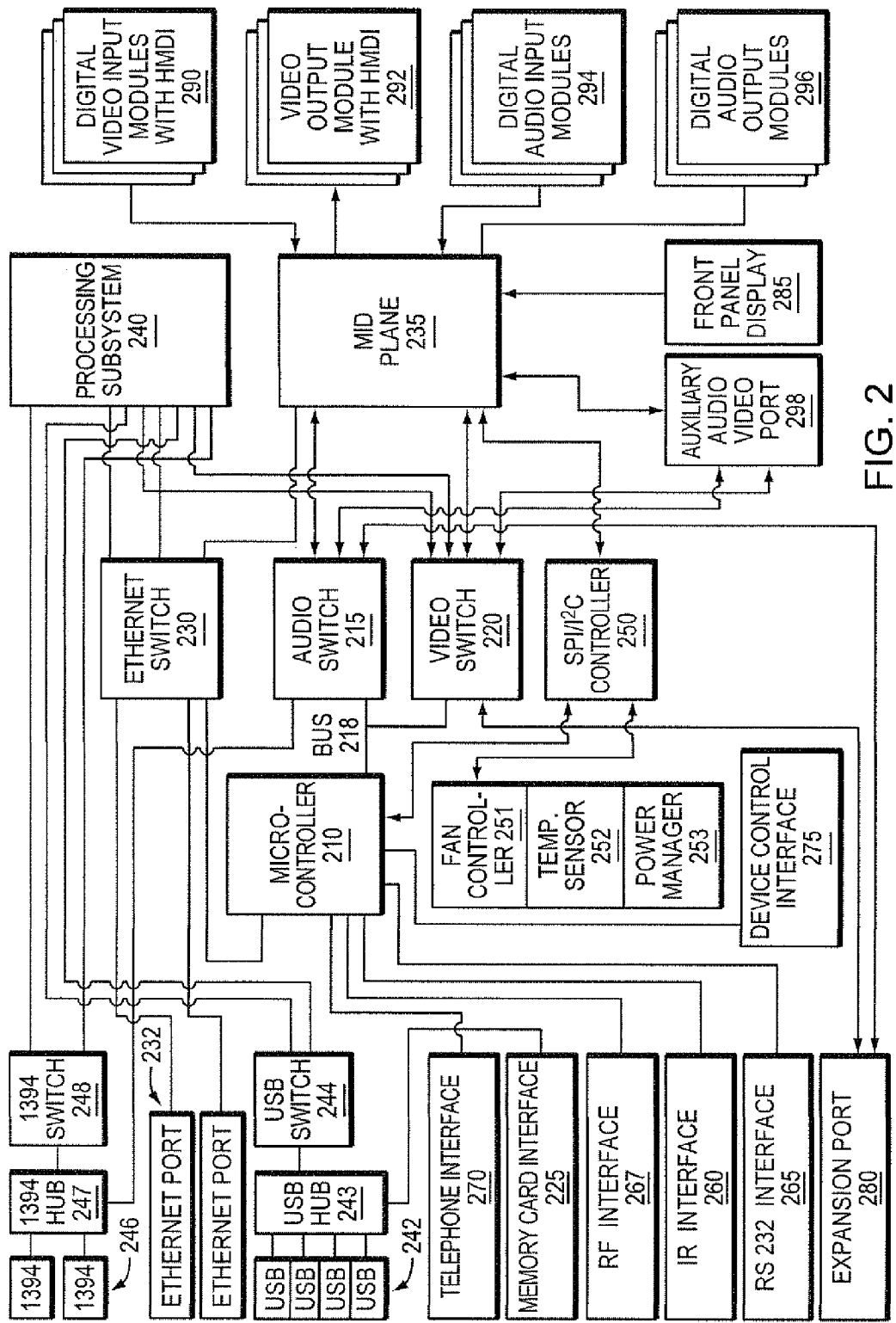
FIG. 2 is a schematic block diagram showing a high-level hardware architecture of the illustrative programmable multimedia controller.

FIG. 2 is a schematic block diagram showing a high-level hardware architecture of the illustrative programmable multimedia controller. The various components shown may be arranged on a "motherboard" of the controller, or on a plurality of cards interconnected by a backplane (not shown). A microcontroller 210 manages the general operation of the system. The microcontroller 210 is coupled to an audio switch 215 and a video switch 220 via a bus 218. The audio switch 215 and the video switch 220 are preferably crosspoint switches capable of switching a number of connections simultaneously. However many other types of switches capable of switching digital signals may be employed, for example Time Division Multiplexing (TDM) switches or other devices.

A mid plane 235 interconnects the switches to a variety of input and output modules such as, for example, Digital Video Input Modules with HDMI 290, Video Output Modules with HDMI 292, Digital Audio Input Modules 294, and Digital Audio Output Modules 296. The mid plane 235 is further coupled to an Ethernet switch 230 that permits switching of 10BaseT, 100BaseT or Gigabyte Ethernet signals. The Ethernet switch 230 interconnects Ethernet ports 232 and a processing subsystem 240 to the microcontroller 210. In one embodiment, the processing subsystem 240 includes a plurality of small form factor general purpose personal computers that provide redundant operation and/or load balancing. In some embodiments, the processing subsystem 240 may include one or more storage devices, external to the personal computers, to provide expanded storage capacity, for example, to store digital media.

Also, a number of Universal Serial Bus (USB) ports 242 are interconnected to a USB hub 243 for interconnection to the processing subsystem 240. A memory card interface 225 may also be connected to the USB hub 243. The interface accepts one or more well-known memory card formats, for example CompactFlash™ cards, Memory Stick™ cards, Secure Digital™ (SD) cards, or other formats. A USB switch 244 is employed to switch USB links among the multiple processing components that may be present in the processing subsystem 240. In a similar manner, a number of IEEE 1394 (FireWire™) ports 246 are interconnected to an IEEE 1394 hub 247 and to an IEEE 1394 switch 248.

The microcontroller 210 is further connected to a Serial Peripheral Interface (SPI) and Inter-Integrated Circuit (I²C) distribution circuit 250, which provides a serial communication interface to relatively low data transfer rate devices. The SPI/I²C controller 250 is connected to the mid-plane connector 235 and thereby provides control commands from the microcontroller 210 to the modules and other devices in the programmable multimedia controller 100. Further connections from SPI/I²C controller 250 are provided to devices such as a fan controller 251, a temperature sensor 252 and a power manager circuit 253, which manage the thermal characteristics of the system and prevent overheating.

The microcontroller 210 is also connected to Infra-Red (IR) interface 260, an RS232 interface 265, and an RF interface 267, that permit interconnection with external devices. Such interaction permits programmable multimedia controller 100 to control external devices. In addition, the interfaces may receive control signals that control the operation of the programmable multimedia controller itself. It is expressly contemplated that various other interfaces, including WI-FI, Bluetooth™, ZigBee™, WirelessUSB™ Certified Wireless USB, and other wired and wireless interfaces, may be used with the multimedia controller 100.

In addition, an Auxiliary Audio/Video Port 298 is provided for interconnecting one or more video game systems, camcorders, computers, karaoke machines, or other devices. A telephone interface 270 is provided for connecting to the public switch telephone network or to a private network, and to connect to one or more telephone handsets. Further, a device control interface 275 is provided to communicate with lighting, home automation, and motor and/or relay operated devices. As discussed in more detail below, an expansion port 280 is provided for linking several programmable multimedia controllers together to form an expanded system. Finally, a front panel display 285 permits presentation of status, configuration, and/or other information to a user. In one embodiment the front panel display may accept video data originating from any input source connected to the system, such that a user may preview video content on the front panel display 285. In another embodiment, the front panel display 285 includes a touch sensitive screen, and a user may enter control selections by selecting icons or other representations on the screen. In this manner the front panel display 285 may be used for control and configuration of the system.

In addition to controlling the programmable multimedia controller 100 using the front panel display 285, the programmable multimedia controller 100 may be controlled by the one or more remote control units 400, as is described in detail below.

Figure 3A:
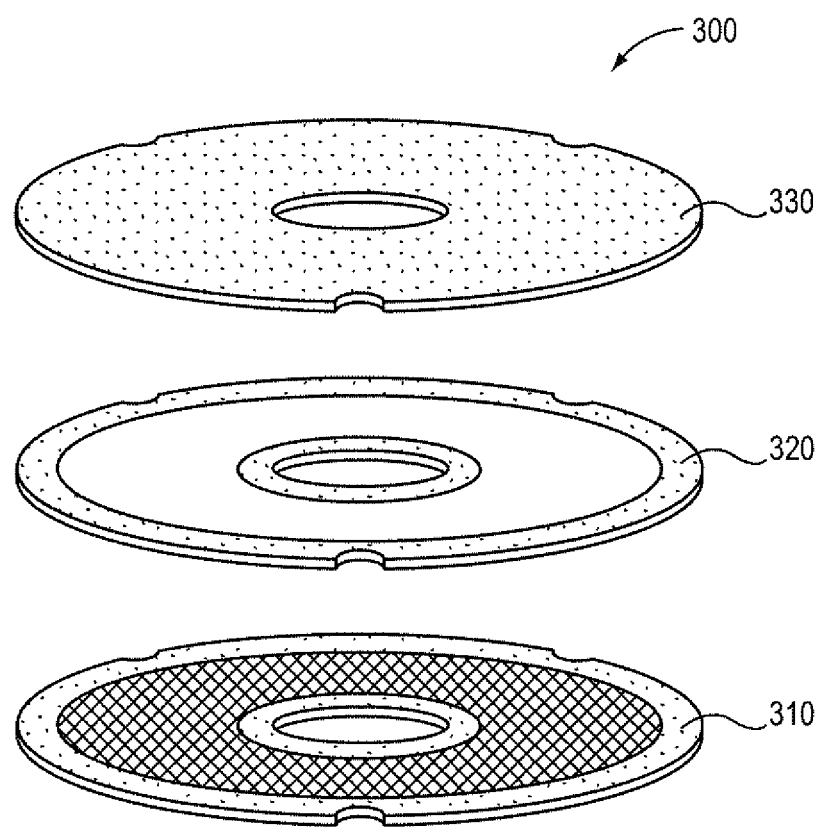
FIG. 3A is a schematic diagram of an example annular touch sensor that may be incorporated into a remote control unit.

FIG. 3A is a schematic diagram of an example annular touch sensor that may be incorporated into a remote control unit. Use of such an annular touch sensor may obviate the need for many of the buttons found on a conventional button-centric remote control unit. While a variety of annular touch sensors are commercially available, and techniques for their design and manufacture using force sensitive resistor (FSR) technology or capacitive sensing technology (for example CapSence™ technology available from Cyress Semiconductor Co.) are well-known in the art, the basic design of one type of touch sensor is described herein to assist the reader. As used herein, the term "annular" should be interpreted to refer to any possible ring-like shape into which a touch sensor may be formed, for example, a circular, elliptical, triangular, or polygonal shape. The term "annular" should also be interpreted to encompass both closed shapes having a continuous path, for example a circle, and open shapes having a non-continuous path, for example a U-shape with an open portion.

The example annular touch sensor operates according to potentiometric principles, thereby translating a user's gestures into electronic signals. Referring to FIG. 3A, a bottom substrate 310 contains a fine grid of highly conductive traces that are supplied with voltage. A flexible top substrate 330 is disposed above the bottom substrate 310 and spaced there from by a spacer layer 320. The spacer layer 320 is thick enough to prevent the lower face of the top substrate 330 from contacting the bottom substrate 310 except when it is touched by a user and thereby deflected into contact with the bottom substrate 310. The top substrate 330 is conductive on its lower face and when brought into contact with the grid of conductive traces on the bottom substrate 310, voltage is passed therebetween. The voltage passed is generally proportional to the location of the touch by the user. By varying which traces of the bottom substrate 310 are charged with voltage, and by taking multiple measurements of the voltage transferred to the top substrate 330, information sufficient to decipher a user's gestures is obtained. This information is thereafter processed by a processor to provide electrical signals descriptive of the user's gesture. For example, if a user touches and holds on the top substrate, slides to another location, and then releases, the annular touch sensor 300 will capture a series of voltage readings that are deciphered to yield the starting location, path, speed, duration of travel, and ending location of the user's gesture. Similarly, if a user simply lightly taps the top substrate at a particular location, the annular touch sensor captures series of voltage readings that are deciphered to yield the location, and duration of the tap.

Figure 3B:
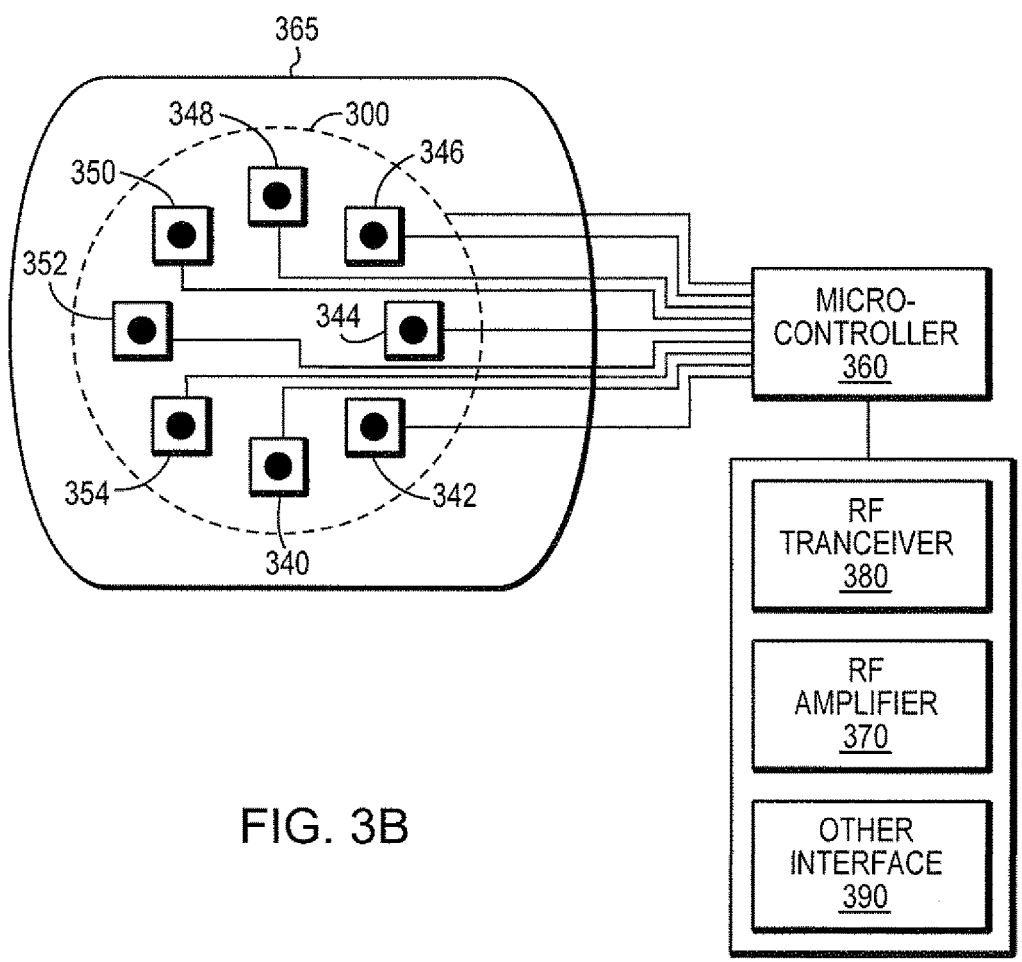
FIG. 3B is a schematic diagram of example switches and related circuitry that may be used in conjunction with the annular touch sensor in a remote control unit.

FIG. 3B is a schematic diagram of example switches and related circuitry that may be used in conjunction with the annular touch sensor in a remote control unit. In addition to detecting tapping and scrolling gestures, in some embodiments, a firm press upon the annular touch sensor is also detected and distinguished from a tap. Many users desire tactile feedback, and a firm press is accompanied by movement of the annular touch sensor 300, and in some configurations a reassuring "click." To accomplish this, the annular touch sensor 300 is supported above a printed circuit board (PCB) 365 by a flexible molding, spring, or other means that permits the sensor to deflect or tilt in response to a firm press. A number of push button switches 342-354 are disposed in the space between the PCB 356 and the annular touch sensor 300. These push button switches may be membrane type switches, surface mount mechanical switches mounted to the PCB 356, or other known types of switches. In response to a firm press at a particular location upon the annular touch sensor 300, the annular touch sensor deflects or tilts so that one or more of the switches are activated. Signals from the switches are received by a microcontroller 360 (for example a programmable System-on-Chip (pSOC)), which is also configured to receive signals from the annular touch sensor 300. The microcontroller 360 debounces the signals and reconciles the signals from the switches and the annular touch sensor 300 to generate commands. These commands are transmitted to the programmable multimedia controller 100, and responsive commands may be received back, using an RF Amplifier 370 and an RF Transceiver 380, or another type of interface 390, for example an infra-red (IR) interface, a Bluetooth™ interface, a ZigBee™ interface, a WirelessUSB™ interface, a Certified Wireless USB interface, and/or a WI-FI interface.

Figure 4:
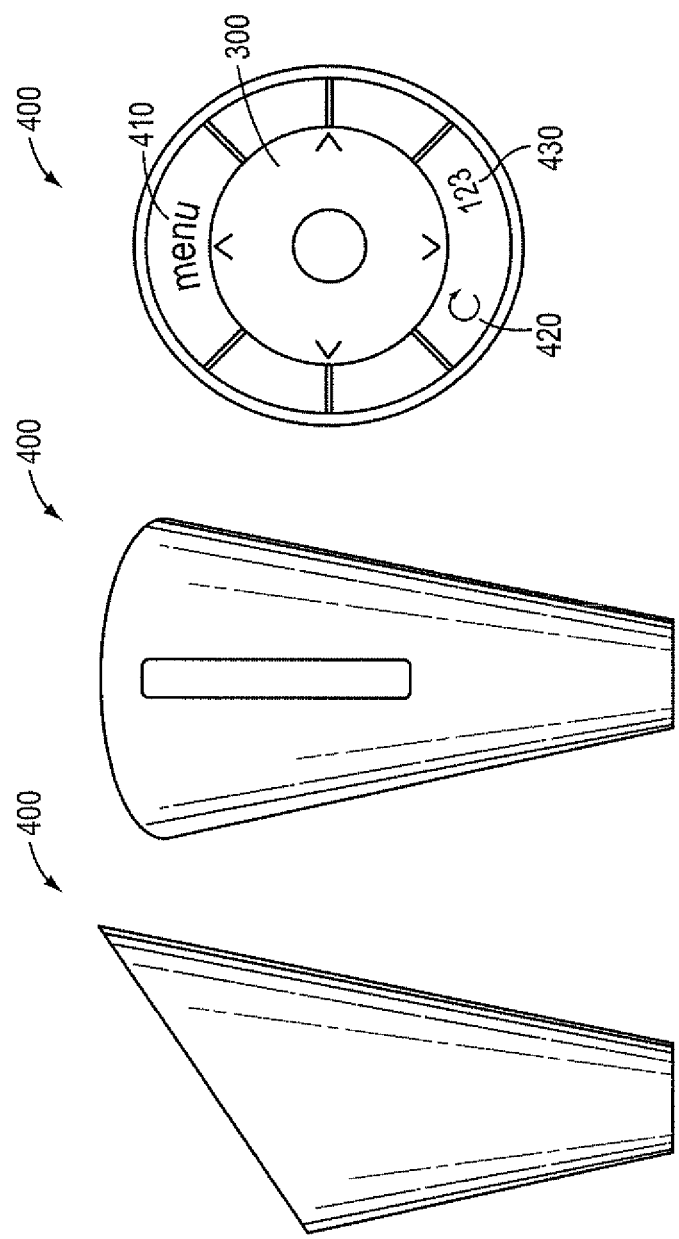
FIG. 4 is a schematic diagram of an example remote control unit that incorporates an annular touch sensor.

FIG. 4 is a schematic diagram showing front, side and top views of an example remote control unit 400 that incorporates an annular touch sensor 300. To address, in part, the shortcomings of a button-centric paradigm, the remote control unit 400 is configured to have a minimal number of buttons, e.g. 410, 420, 430 visible to the user. In one embodiment, the buttons 410, 420, 430 are reserved for frequently used functions, such as to activate a menuing system of the programmable multimedia controller 100, or to return to a previous menu of such a menuing system. In another embodiment, the buttons are used for context dependent input, such that, depending on the current operational state of the programmable multimedia controller 100, the buttons have differing functions. For example, if the programmable multimedia controller 100 is currently controlling a television, a certain button may control channel selection on the television. Likewise, if the programmable multimedia controller is currently being used to provide telephony services, the same button may perform a different function of initiating a telephone call.

Also located on the remote control unit 400, is an annular touch sensor 300, which is the primary means for entry of user commands. In one embodiment, the annular touch sensor is used in conjunction with a menuing system presented by the programmable multimedia controller 100, to thereby control both the programmable multimedia controller and devices interconnected thereto. The menuing system is driven by the processing power of the programmable multimedia controller 100, allowing the remote control unit to possess minimal processing power itself, thus reducing complexity and cost of the controller compared to prior systems.

The menuing system may be displayed on any of a variety of display devices interconnected to the programmable multimedia controller 100, such as televisions 120, computer monitors, desktop displays, touch-screens, or other types of display devices. In some embodiments, the menuing system is displayed on the front panel display 285 of the programmable multimedia controller itself, while in other embodiments, the remote control unit 400 includes a display screen for display of the menuing system. Hereinafter, any display device on which the menuing system may be displayed will be referred to simply as a "menuing capable display," and such term should be interpreted broadly to encompass all of the above discussed alternatives, and variations thereof.

Each menuing capable display may display the menuing system on the entire display, i.e. as a full-screen menuing system, or may show the menuing system as an overlay upon a portion of video or still images, i.e. as a partial-screen menuing system. One technique for overlaying a menuing system (or other graphics or text) upon video or still images is disclosed in SYSTEM AND METHOD FOR A PROGRAMMABLE MULTIMEDIA CONTROLLER, by Robert P. Madonna, et al., and the reader is referred thereto for further details. While the technique disclosed therein may be used to advantage with the present disclosure, it is expressly contemplated that other techniques may alternately be employed.

As described therein, video, graphics, and/or text may be overlaid at any location of a video display on a pixel by pixel basis, other near pixel-by-pixel basis. Because the overlay is determined on to such a fine scale, an overlay of virtually any shape is possible. Further, the location of the overlay may be dynamically configured. That is, the region of display where the overlay is shown may be repositioned on a frame-by-frame basis, for example, to create a "moving" overlay. Further, mixing and blending logic may allow overlaid video, graphics, and/or text to be displayed in a semi-transparent manner or with a fade-in/fade-out effect.

To achieve the above described capabilities, the system takes advantage of the large number of colors that may be represented by digital video signals. For example, digital video signals encoded for 24-bit color are capable of representing about 16.7 million unique colors. In one embodiment, the video processor changes the colors associated with the pixels in a region of a frame, where the video overlay is desired, to a predetermined color. The predetermined color may be an arbitrarily chosen color, preferably a color that has been determined to be used at a lower than average frequency in typical video. The video mixer is configured to recognize occurrences of the predetermined color, and at each pixel of a video frame where such color is present, substitute video data from another video stream.

By selecting different pixels to be changed to the predetermined color, the area of the video display that is overlaid can be readily changed. In such a manner overlays may be dynamically moved about the screen, or menus of any shape may be shown to dynamically expand to other screen regions when selected.

Generally, due to the large number of colors that may be represented by video signals, any "natural" occurrences of pixels of the predetermined color will be relatively low, and any inadvertent overlay of video resulting from such pixels will not be noticeable to a viewer. In an alternate embodiment, the video processor, prior to changing selected pixels of a frame to the predetermined color, may scan the frame for occurrences of the color and change such pixels to a nearly identical shade, for example by adding a single bit. In such a manner inadvertent video overlays may be substantially eliminated.

In yet another embodiment, the video processor may change pixels in the region to be overlaid to a predetermined pattern of colors. For example, adjacent pixels may be changed to a repeating two-three-pixel pattern, where each of the three adjacent pixels is a different predetermined color. As the probability of three predetermined colors occurring in adjacent pixels is extremely low, "natural" occurrences may be substantially eliminated.

It is further contemplated that it may be desirable to overlay portions of several distinct video streams onto each frame of a video display. It will be apparent to one skilled in the art that the above described technique may be extended by selecting additional predetermined colors to represent each overlay and configuring the video mixer to apply overlays where each of these colors is detected.

During normal operation, a user may focus their attention upon the menuing system on the menuing capable display, and control the remote control unit 400 largely through tactile sensation. In one configuration, the remote control unit 400 is designed to rest most comfortably at a particular orientation in the user's hand, such that the buttons and annular touch sensor 300 are always at particular positions with respect to the user's fingers. For example, the roughly cone shaped remote control unit 400 of FIG. 4 fits naturally in a user's hand with the user's palm and fingers wrapped around the circumference of the cone, and the user's thumb resting on the top of the cone, with the top of the cone inclining away from the user. As the remote control unit is generally always oriented in the same manner when operated, the user may operate the remote largely without looking thereto.

Figure 5:
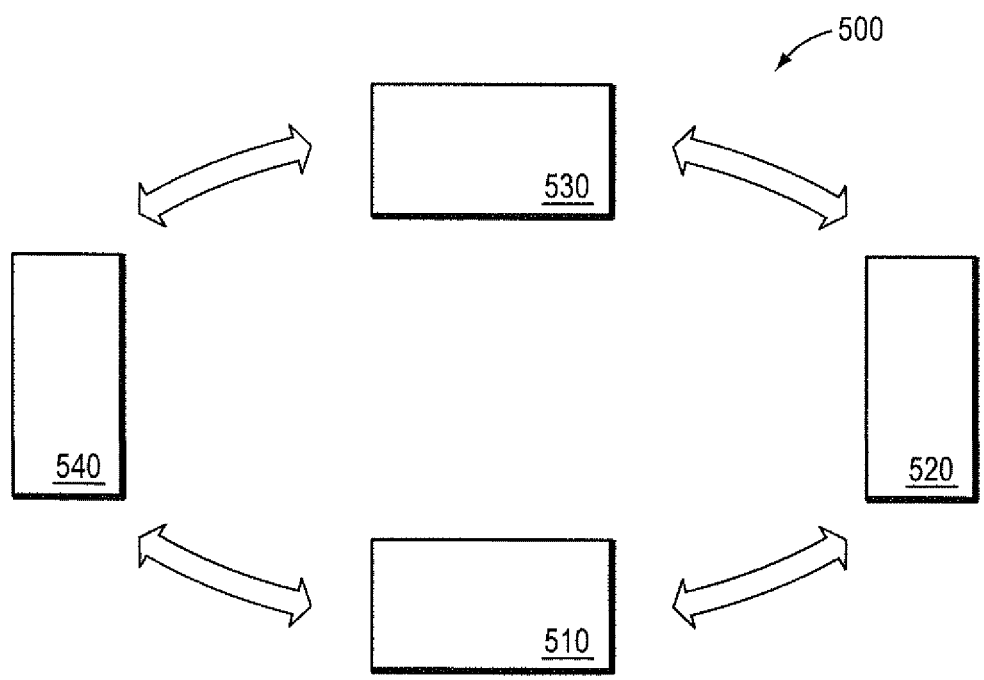
FIG. 5 is a diagram of a first example annular menuing system adapted to the shape of the annular touch sensor of FIG. 3.

FIG. 5 is a diagram of a first example annular menuing system 500 adapted to the shape of the annular touch sensor 300 of FIG. 3. Such a menuing system may be displayed on any menuing capable display observable to the user. The menuing system 500 is composed of a plurality of selectable options 510, 520, 530, 540 displayed in an annular configuration. While only four selectable options are shown in FIG. 5, any number of selectable options may be provided. The annular menuing system may be two-dimensional, with the selectable options 510, 520, 530, 540 arranged in a plane parallel to display screen, or may be three-dimensional, such that the selectable options 510, 520, 530, 540 are arranged in an annular pattern in three-dimensional space, and an image of the three-dimensional space is displayed to the user. Similarly, the selectable options themselves 510, 520, 530, 540 may be two or three-dimensional representations. In one embodiment, the selectable options 510, 520, 530, 540 are graphic icons, whose appearances are related to, or otherwise associated with, their respective functions. For example, the selectable options 510, 520, 530, 540 may be graphic icons representing the devices controlled by the programmable multimedia controller 100, and their selection may be used to indicate one of the devices for further control. Similarly the selectable options 510, 520, 530, 540 may be graphic icons related to Internet web pages, and their selection may be used to navigate to those webpages. In another embodiment, the selectable options are text characters, such as words, or individual numerals or letters. In such an embodiment, the annular menuing system may be used to input a number, such as a channel number or telephone number, or a text string, such as a name, a postal address, or a URL of a webpage. In this manner, the remote control unit may be used to replace a conventional keyboard and mouse for input and text entry.

To select the different selectable options 510, 520, 530, 540, a user gestures with the annular touch sensor 300 of the remote control unit 400. In one embodiment, the user gestures by scrolling with his or her finger clockwise or counter-clockwise about the annular touch sensor 300. In response thereto, the selectable options 510, 520, 530, 540 rotate on the menuing capable display. For example, referring to FIG. 5, selectable option 520 may rotate into the position now-occupied by selectable option 510, in response to a clock-wise gesture by the user. In some embodiments, the rate of rotation of the selectable options is related to the rate of the user's scrolling on the annular touch sensor 300. This may permit fine grain control of the menuing system.

A user may select a selectable option 510, 520, 530, 540 by bringing the option to a designated location in the annular menuing system 500, for example to the foreground location of a three-dimensional annular menuing system, or the bottom location of a two-dimensional annular menuing system. Once at the designated location, the user selects the selectable option by releasing his or her finger from the annular touch sensor 300, pressing firmly on the annular touch sensor, tapping the annular touch sensor, pressing a button, and/or by performing another recognized action.

In another embodiment, rather than rotating a selectable option to a designated location in the menuing system 500, the user selects a particular selectable option by gesturing, for example pressing firmly or tapping, at a particular position on the annular touch sensor 300. By gesturing at a position that corresponds to the position of the selectable option in the menuing system 500, the particular selectable option is chosen. For example, referring to FIG. 5, where four selectable options are shown oriented in four quadrants, if the user gestures on the right hand portion of the annular touch sensor 300, the rightmost selectable option 520 is selected.

Figure 6A:
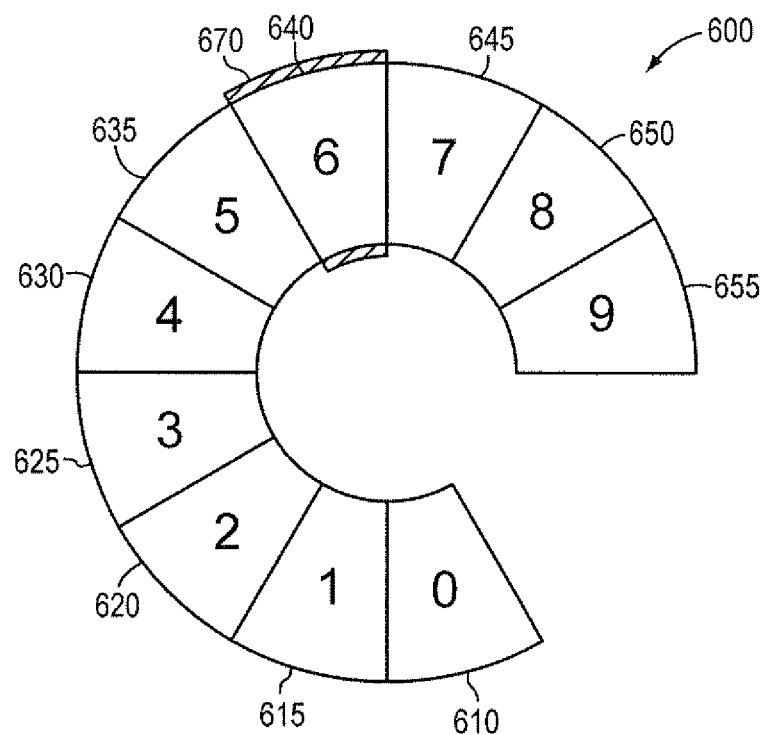
FIG. 6A is a diagram of a second example annular menuing system adapted to the shape of the annular touch sensor of FIG. 3.

FIG. 6A is a diagram of a second example annular menuing system 600 adapted to the shape of the annular touch sensor 300 of FIG. 3. Such an annular menuing system may be advantageous for use with numeral input, and such an adaptation is pictured in FIG. 6A. Numerals 0 through 9 are each displayed in separate regions 610-655. In one embodiment, a movable selection cursor 670 is disposed on the menuing system. In response to a user gesturing on the annular touch sensor 300, by scrolling clockwise or counter-clockwise, the selection cursor 670 is moved clockwise or counter-clockwise about the annular menuing system 600. Once the selection cursor is located over the desired region 610-655, the user selects the region, and its associated numeral, by releasing the annular touch sensor, pressing firmly on the annular touch sensor, tapping the annular touch sensor, or otherwise indicating selection.

In an alternate embodiment, rather than manipulate a selection cursor 670, a user selects a region by gesturing, for example by pressing firmly or tapping, at a particular position on the annular touch sensor 300. In response thereto, the region, and the associated numeral, of the menuing system 600 whose position corresponds to that position is selected. For example, referring to FIG. 6A, if the user taps at the very top of the annular touch sensor 300, the region 640, and thereby numeral 6, in the corresponding position on the menuing system 600 is selected.

Numerals input by the menuing system 600 may be used in a variety of manners by the programmable multimedia controller 100. For example, the numerals may be used to enter channel numbers for television viewing, to input telephone numbers for telephony functions, or to interact with online purchasing services. A fuller listing of possible functions and services with which numeral entry may be used is found in MULTIMEDIA CONTROLLER WITH PROGRAMMABLE SERVICES, by Robert P. Madonna, et al., and the reader is referred thereto for greater detail.

Further, while the above description discusses selection of numerals with the menuing system 600, the menuing system may readily be adapted for other types of input, such as character input, with letters assigned to each region; string input, with several characters (i.e. words) assigned to each region; or device selection, with device icons or names associated with each region. As such, the description of the menuing system 600 should be interpreted broadly and not be limited to particular type of input or selection.

Figure 6B:
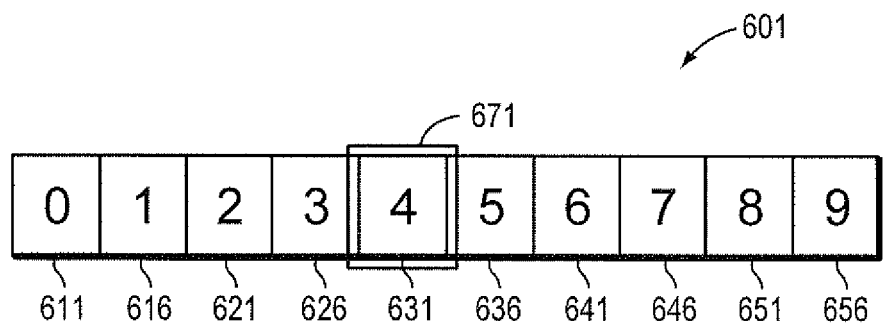
FIG. 6B is a diagram of an example linear menuing system that may be controlled by gestures on the annular touch sensor of FIG. 3.

Also, while annular menuing systems are described above, it should be remembered that the menuing system need not be annular in all configurations. FIG. 6B is a diagram of an example linear menuing system 601 that may be controlled by gestures on the annular touch sensor 300. While the example in FIG. 6B is adapted for numeral input, with regions 611-656 associated with the numerals 0-9, such a linear menuing system 601 may readily be used to facilitate character input, with letters A-Z each associated with each region, or alternately string input or control input. A selection cursor 671 is disposed upon the linear menuing system 601. In response to the user gestures by scrolling with his or her finger clockwise or counter-clockwise about the annular touch sensor 300, the selection cursor 671 is moved rightwards or leftwards. That is, annular movement on the annular touch sensor 300 is translated to linear movement of the selection cursor 671 in the linear menuing system 601. Once the selection cursor 671 is located over the desired region 611-656, the user selects the region, by releasing the annular touch sensor, pressing firmly on the annular touch sensor, tapping the annular touch sensor, or otherwise indicating selection.

Furthermore, while several menuing systems have been described herein for use with the annular touch sensor 300, it should be remembered that a menuing system need not always be employed with the sensor. In one embodiment, rather than being used to manipulate a menuing system, gestures on the annular touch sensor 300 have predefined meanings, apart from any menuing system. By entering a particular gesture, an associated command is triggered. For example, if a television is currently being controlled by the programmable multimedia controller 100, pressing firmly or tapping on the upper or lower portions of the annular touch sensor is interpreted to increment or decrement the channel number shown on the television. Similarly, pressing firmly or tapping on the left-side or right-side portions of the annular touch sensor is interpreted to raise or lower the volume of the television. In another embodiment, if a video camera is currently being controlled by the programmable multimedia controller 100, gesturing by scrolling clockwise or counter-clockwise on the annular touch sensor 300 is interpreted to pan the video camera left or right. In this manner, the annular touch sensor may be used with a variety of control functions absent a menuing system.

Figure 7:
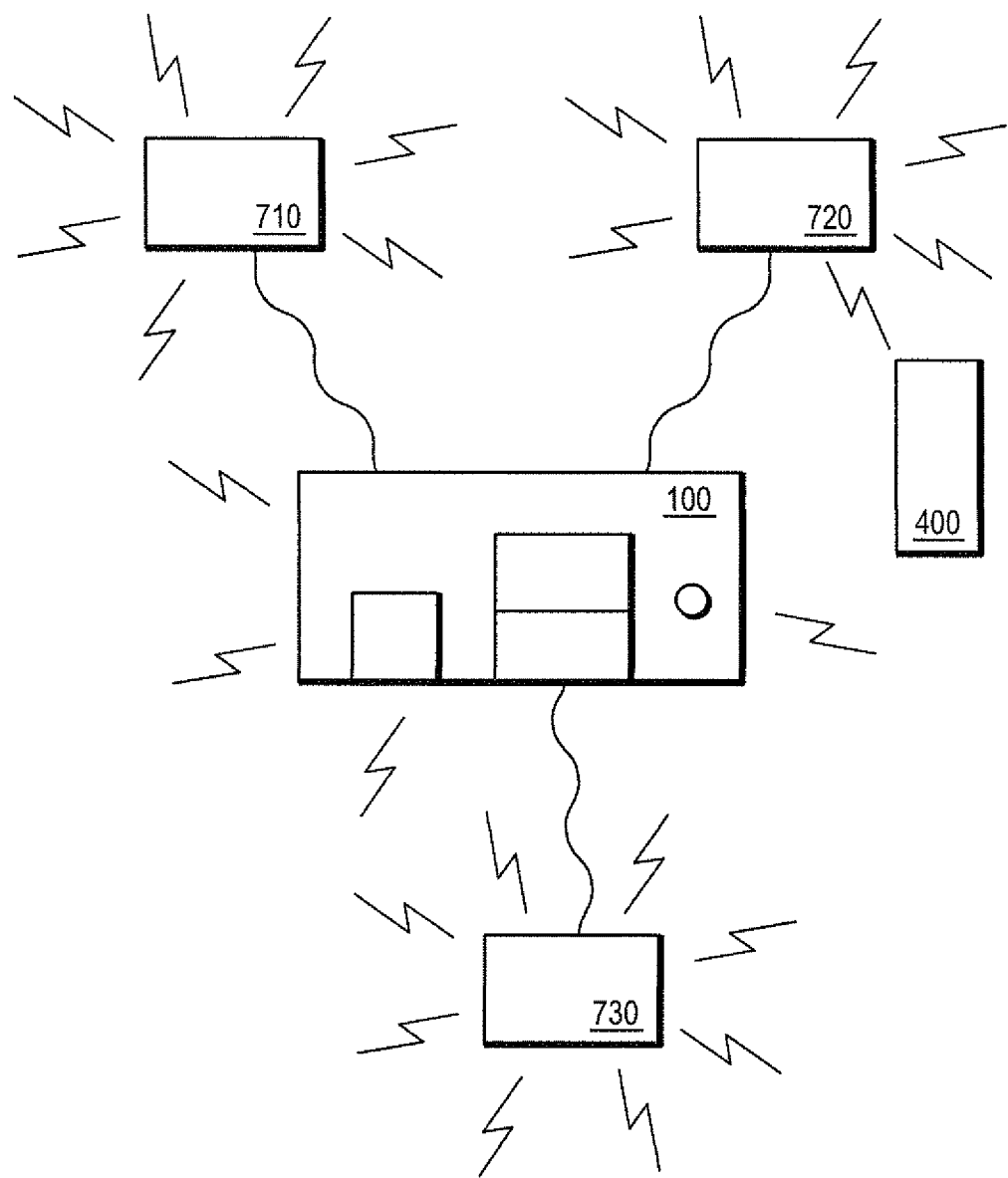
FIG. 7 is a schematic diagram depicting an example technique for providing location-awareness functionality to a remote control unit.

In addition to employing an annular touch sensor 300, the example remote control unit 400, is configured to implement location-awareness features. FIG. 7 is a schematic diagram depicting an example technique for providing location-awareness to the remote control unit 400. A number of transmitter/receiver units 710, 720, 730 are dispersed throughout a structure where the programmable multimedia controller 100 is located, for example the user's home. The units 710, 720, 730 may be located on separate floors, in separate rooms, or even in different portions of the same room depending upon the desired level of location-awareness. Each transmitter/receiver unit is connected back to the programmable multimedia controller 100 by a wired connection, such as an Ethernet cable providing Power over Ethernet (PoE) service, or by a wireless connection, for example a WI-FI connection. Further, each transmitter/receiver unit 710, 720, 730, as well as the programmable multimedia control 100 itself, implements a wireless interface for communicating with the remote control unit 400. The wireless interface may be any of a variety of known interfaces, for example an infra-red (IR) interface, a radio-frequency (RF) interface, a Bluetooth™ interface, a Zig-Bee™ interface, a WirelessUSB™ interface, a Certified Wireless USB interface, and/or a WI-FI interface.

Depending on the location of the remote control unit 400, a signal transmitted there from is received by one or more transmitter/receiver units 710, 720, 730 and/or the programmable multimedia controller 100 itself. According to one embodiment, if the signal is received by only one device, the location of that device is associated with the remote control unit 400. If the signal is received by several devices, the signal strength at each device is measured and compared, and the location of the device that detects the strongest signal is associated with the remote control unit 400. For example, if the signal transmitted by the remote control unit 400 is received by two transmitter/receiver units 720, 730 as well as the programmable multimedia control 100, and a particular transmitter/receiver unit 720 detects the greatest signal strength, the remote control unit 400 is associated with location of that transmitter/receiver unit 720.

According to another embodiment, rather than measure signal strength, the devices employ triangulation techniques to determine a location of the remote control unit 400 with respect to the transmitter/receiver units 710, 720, 730. By employing triangulation techniques a limited number of transmitter/receivers may be used, while a very precise location for the remote control unit provided.

In yet another embodiment, global positioning techniques may be employed with the remote control unit 400. The remote control unit 400 may include a global positioning system (GPS) receiver that determines a precise location from received GPS signals. This location is then transmitted from the remote control unit 400 to the programmable multimedia controller 100.

Once the location of the remote control unit 400 is determined, the programmable multimedia controller 100 adapts control functions in accord with the devices that are proximate to that location. In one embodiment, a menuing system is displayed on the menuing capable display most proximate to the location of the remote control unit. For example, suppose a first television (not shown) that is connected to the programmable multimedia controller 100 is located proximate to a first transmitter/receiver unit 710 and a second television (not shown) that is connected to the programmable multimedia controller 100 is located proximate to a second transmitter/receiver unit 720, and remote control unit is located near the second transmitter/receiver unit 720. In response to the user manipulating the remote control unit 400, a menuing system may be automatically displayed on the second television, absent any user specification of that display. Suppose also that, at some later time, the user leaves the location, i.e. walks to another room, and the remote control unit 400 comes to be located near the first transmitter/receiver unit 710. The programmable multimedia controller 100 is configured to recognize this change, and in response thereto, now display the menuing system on the first television that is nearby the first transmitter/receiver unit 710.

In addition to providing location-awareness features, each transmitter/receiver unit itself may implement control features. In one embodiment, a transmitter/receiver unit includes a plurality of buttons and/or an annular touch sensor. These buttons and annular touch sensor operate to control the programmable multimedia control in a similar manner to the buttons and touch sensor on the remote control unit. Thus a user is given an option of using a remote control unit, or a transmitter/receiver unit to input control choices.

In another embodiment, the particular device activated or controlled by an action on the remote control unit 400 depends on the location of the remote control unit. For example, suppose a user enters a command on the remote control unit to turn on a television for viewing. If the user is located most proximate to the second television, the second television may be activated without explicit user specification. Alternately, if the user is located nearby the first television, that television may be activated instead. In such manner, the user is freed from explicitly selecting a television, and such selection instead is made by the programmable multimedia controller 100 in response to location information and assumptions regarding typical user activities. If the assumptions made by the programmable multimedia controller prove to be incorrect, the user may always override the selection and explicitly specify the device to be controlled according to well known techniques.

In a further example, location-awareness may be applied to the area of lighting control. Suppose a number of lighting fixtures are controlled by a lighting controller (not shown) interconnected to the programmable multimedia controller 100 and a button on the remote control unit 400 is mapped to a "light switch" function, to activate or deactivate lighting fixtures. Depending on the location of the remote control unit 400, light fixtures proximate to the location are controlled by the button, i.e. the lights in that room turned on or off. If a user walks to another location, i.e. to another room, the lights therein will be controlled by the button absent explicit specification of the new lighting fixtures or of the new room entered.

While the above embodiments discuss televisions and lighting fixtures, location-aware control may be readily applied to any of the devices controlled by the programmable multimedia controller. Accordingly, it is expressly contemplated that a variety of audio, video, telephony, data, security, motor-operated, relay-operated, and/or other types of devices may be controlled in response to location information.

Further, while the above described techniques discuss determining the location of the remote control unit with transmitter/receiver units 710, 720, 730, alternately, the location of the remote control unit 400 may be determined in another manner. For example, each remote control unit may be configured to include a Radio Frequency Identification (RFID) transponder, and a number of RFID scanners (not shown) dispersed at different locations. Upon entering a new location, the user may move the remote control unit into proximity of the RFID scanner to record the remote control unit's location. In another alternative, the remote control unit 400 may be physically coupled, i.e. docked, with a base unit at a particular location. In response thereto, the location of the remote control unit may be determined by the base unit to which it is coupled.

In addition to location-aware control, in another embodiment each remote control unit is configured provide user-aware control. A number of remote control units are provided for use with the programmable multimedia controller, each associated with a particular user. When a user manipulates his or her particular remote control unit, a user profile is accessed and user-specific options applied to the control scheme. For example, a user may have selected certain menu arrangements and styles that suit particular preferences. These arrangements and styles are displayed when the user manipulates his or her particular remote control unit. Similarly, a user may have access to certain devices or services controlled or offered by the programmable multimedia controller, while another user may not. For example, a user who is a young child may not have access to certain channel which may contain adult content, or to certain configuration options where the systems function may be changed in an unwanted manner, while a user who is an adult may have complete control. In this manner different users, through use of their particular remote control units, may have different control privileges.

The foregoing description has been directed to particular embodiments of this disclosure. It will be apparent, however, that other variations and modifications may be made to the described embodiments, with the attainment of some or all of their advantages. While the above descriptions mainly discuss a remote control unit connected via a wireless interface, a wired interface may alternately be employed. In one embodiment, this wired interface may take the form of a Power over Ethernet (PoE) interface to the programmable multimedia controller, such that in addition to the interchange of control information, power may be supplied by the interface. Further, while the above descriptions discuss the remote control unit working with a programmable multimedia controller, the remote control unit may alternately be configured work with just a conventional general purpose computer and attached display screen. In such a configuration, the remote control unit may be used to control the general purpose computer's functions through a menuing system displayed on the computer's monitor. For example, a user may use the remote control unit and menuing system to control an Internet browsing function of the computer to interaction with online services.

Additionally, the procedures or processes described above may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method comprising:
receiving input from a user on a remote control unit within a structure;
determining a location of the remote control unit within the structure;
in response to the determined location of the remote control unit being more proximate to a first television located within a first room of the structure than to a second television located within a second room of the structure, automatically displaying a menuing system of a controller having a plurality of selectable options on the first television, rather than on the second television, absent any user specification of the first television; and
in response to the determined location of the remote control unit being changed to be more proximate to the second television than the first television, automatically displaying the menuing system of the controller on the second television rather than on the first television, absent any user specification of the second television, wherein the controller is separate from the first and second televisions, and the selectable options of the menuing system of the controller include selectable options that control operation of one or more devices separate from the controller and the first and second televisions, the devices being part of an audio/video system, a lighting system, a heating ventilation and air/conditioning (HVAC) system, and/or an automatic shade system coupled to the controller.

2. The method of claim 1, wherein the location of the remote control unit is determined based on the remote control unit wirelessly communicating with a particular transmitter and/or receiver unit of a plurality of transmitter and/or receiver units disposed about the structure.

3. The method of claim 2, wherein the particular transmitter and/or receiver unit is selected based on a comparison of signal strengths associated with the plurality of transmitter/receiver units disposed about the structure.

4. The method of claim 2, wherein a known location of the particular transmitter and/or receiver unit is used as the location of the remote control unit.

5. The method of claim 2, wherein the plurality of transmitter and/or receiver units are Bluetooth-enabled transmitter/receiver units and the wirelessly communicating includes exchanging Bluetooth signals.

6. The method of claim 1, wherein the location of the remote control unit is determined based on the remote control unit being docked to a base station of a plurality of base stations disposed about the structure.

7. The method of claim 1, wherein actions caused by selection of ones of the plurality of selectable options in the menuing system of the controller depend on the location of the remote control unit, such that an action performed when the remote control unit is more proximate to the first television differs from an action performed when the remote control unit is more proximate to the second television.

8. A non-transitory computer-readable medium having instructions encoded thereon, the instructions when executed by one or more processors, operable to:

determine a location of the remote control unit within a structure based on signals exchanged with transmitter and/or receiver units;

in response to the determined location of the remote control unit being more proximate to a first transmitter and/or receiver unit than to a second transmitter and/or receiver unit within the structure, automatically display a menuing system of a controller having a plurality of selectable options on a first television, rather than on a second television, absent any user specification of the first television; and in response to the determined location of the remote control unit being changed to be more proximate to the second transmitter and/or receiver unit than the first transmitter and/or receiver unit, automatically display the menuing system of the controller on the second television, rather than on the first television, absent any user specification of the second television, wherein the controller is separate from the first and second televisions, and the selectable options of the menuing system of the controller include selectable options that control operation of one or more devices separate from the controller and the first and second televisions, the devices being part of an audio/video system, a lighting system, a heating ventilation and air/conditioning (HVAC) system, and/or an automatic shade system coupled to the controller.

9. The non-transitory computer-readable medium of claim 8, wherein actions caused by selection of ones of the plurality of selectable options in the menuing system of the controller depend on the location of the remote control unit, such that an action performed when the remote control unit is more proximate to the first transmitter and/or receiver unit differs from an action performed when the remote control unit is more proximate to the second transmitter and/or receiver unit.

10. The non-transitory computer-readable medium of claim 8, wherein the location of the remote control unit is determined based on the remote control unit wirelessly communicating with a particular transmitter and/or receiver unit of a plurality of transmitter and/or receiver units disposed about the structure.

11. The non-transitory computer-readable medium of claim 10, wherein the particular transmitter and/or receiver unit is selected based on a comparison of signal strengths associated with the plurality of transmitter/receiver units disposed about the structure.

12. The non-transitory computer-readable medium of claim 10, wherein a known location of the particular transmitter and/or receiver unit is used as the location of the remote control unit.

13. The non-transitory computer-readable medium of claim 10, wherein the plurality of transmitter and/or receiver units are Bluetooth-enabled transmitter/receiver units and the wirelessly communicating includes exchanging Bluetooth signals.

14. The non-transitory computer-readable medium of claim 8, wherein the location of the remote control unit is determined based on the remote control unit being docked to a base station of a plurality of base stations disposed about the structure.

* * * * *

UNITED STATES PATENT AND TRADEMARK OFFICE
CERTIFICATE OF CORRECTION

PATENT NO. : 9,541,910 B2
APPLICATION NO. : 14/166287
DATED : January 10, 2017
INVENTOR(S) : Robert P. Madonna et al.

Page 1 of 1

It is certified that error appears in the above-identified patent and that said Letters Patent is hereby corrected as shown below:

In the Specification

Column 2, Line 61 reads:
cated and costly to manufacture. Further, the touchscreen
Should read:
cated and costly to manufacture. Further, the touch-screen Signed and Sealed this
Second Day of October, 2018

Andrei Iancu
*Director of the United States Patent and Trademark Office*